United States Patent Office 3,432,511
Patented Mar. 11, 1969

3,432,511
PROCESSING OF PLASTIC MATERIALS
Victor G. Reiling, Dayton, Ohio, assignor to The Duriron Company, Inc., Dayton, Ohio, a corporation of New York
No Drawing. Original application Nov. 7, 1961, Ser. No. 150,659, now Patent No. 3,247,116, dated Apr. 19, 1966. Divided and this application May 5, 1965, Ser. No. 462,465
U.S. Cl. 260—92.1
Int. Cl. C10m 7/28; C08f 3/24, 27/28
2 Claims

ABSTRACT OF THE DISCLOSURE

Polytetrafluoroethylene is degraded by heating it in the range of 785° to 880° F. until the tensile strength of the material is reduced. Thereafter, the degraded material is comminuted into a fine powder which may be dispersed in a carrier by blending without causing agglomeration thereof. Various carriers include varnish, alkyd resins, shellac, sodium silicate and the like and operate as a binder to adhere the degraded polytetrafluoroethylene to a surface to impart antifriction properties thereto.

---

This invention relates to the processing of sintered plastic materials and to products obtained thereby.

The invention has particular relation to the processing of fluorocarbon resin polymers such as the tetrafluoroethylene polymers sold under the trademark Teflon, which are available commercially in powdered form and which are commonly fabricated by preforming under pressure to compact the powder to the desired shape followed by sintering or baking under relatively high temperature.

Materials of the above type are characterized, among other properties, by extreme inertness and also very low frictional properties, even in the absence of lubricants, which render them especially suitable for use in bearings. In fact, the antifriction properties of these materials are so high that they can be employed in powder form as lubricants for metal parts such as bearings if they can as a practical matter be applied to and retained in the space to be lubricated. For example, if such material in powdered form is mixed with a grease or other liquid lubricant, a lubricating mixture is produced which has very high lubricating properties together with substantial body and high stability, and the liquid lubricant will act as a carrier to hold the powder together and in the desired space for use. However, some difficulty is encountered in producing the desired mixture with powdered virgin (unsintered) fluorocarbon resins because of their tendency to agglomerate and thus to resist dispersion with the desired uniformity in the lubricant or other carrier vehicle.

In accordance with the present invention, it has been discovered that compositions of valuable properties from the standpoint of stability, minimum friction, and particularly of ease of incorporation in a desired vehicle, can be obtained if the fluorocarbon polymer resin is subjected to heating to an elevated temperature which is in the range of the degradation temperature of the material before it is mixed with the vehicle. Futhermore, the process of the invention is applicable not only to virgin resin but also to resin which has already been sintered in conjunction with prior processing. Thus for the purposes of the invention, it is possible to use scrap from sintered parts of fluorocarbon resins which has been trimmed away from the finished parts, and in fact it appears that scrap material of this nature is preferred for the practice of the invention as compared with the virgin material.

It is therefore an object of this invention to provide new and improved antifriction compositions incorporating finely divided fluorocarbon polymers in a carrier vehicle and wherein the finely divided polymer is uniformly dispersed throughout the vehicle.

An additional object of the invention is to provide a composition as outlined above wherein the resin material has been heated to a temperature above its normal sintering range and wherein therefore the resin material may be scrap or like material which has already been sintered in connection with other fabricating operations thereon.

It is also an object of the invention to provide a process for producing compositions of the characteristics outlined above, and particularly to provide such a process which is equally applicable to virgin material and to previously sintered material and which involves heating the resin material to a temperature at which degradation of the resin occurs followed by grinding to finely divided form and incorporation in a liquid vehicle.

Further objects and advantages of the invention will be apparent from the following description and the appended claims.

In a preferred embodiment of the invention, scrap fluorocarbon material which has already been sintered, such as the trim left after punching gaskets from a sheet of preformed and sintered stock, is heated in an oven for a sufficient time at a temperature sufficiently higher than the gel point of the material for appreciable degradation of the material to take place, for example a temperature in the range of 785° to 880° F. for an interval of the order of two hours. After the material has cooled, it no longer has the impact or tensile strength of the original sintered material, nor can it again be preformed and sintered as in the case of the virgin material, but it still exhibits the lubricity qualities of the original material.

For the purposes of the present invention, a further significant characteristic of the partially degraded resin material, in addition to its maintained and antifrictional characteristics, may be understood with reference to the conventional processing of Teflon, for example.

Tetrafluoroethylene polymers are commercially available in a powdered form which resembles common household flour. According to one mode of processing, the powder is compacted to what is called "preform" and subsequently sintered to at least 621° F. as a minimum, and generally to 720° F.±5° to provide the finished product. In the preformed material, there is no chemical bonding between the particles which have been compacted. Chemical bonding between the individual particles present in the preform is accomplished by sintering or heating the preformed material.

As a practical illustration of the differences between the sintered, the preform or compacted material, and the degraded material of this invention, it may be noted that sintered material is very difficult to pick or cut away with a fingernail, while in the case of the preform or compacted powder, cutting or chipping away with the fingernail is easily accomplished since the powdered particles have not been tied together by the bonding which occurs during sintering. In the case of the degraded product of this invention, which can be formed into a block form, it is easier to cut or pick away than the sintered material but slightly more difficult to cut than the preform or compacted material. While the comminuted or finely ground degraded product may physically resemble the virgin powdered material prior to compacting and sintering, the virgin powdered material inherently possesses the capability of bonding to provide a resilient product, while the degraded material no longer possesses such a capability. For example, the impact strength and the tensile strength of the degraded material are significantly less than that of the sintered material.

It has been discovered that while the degraded material loses some of the characteristics commonly associated with polytetrafluoroethylene resins, such as impact and tensile strength, it retains such desirable characteristics as low coefficient of friction and chemical inertness. In addition it has been discovered that the powdered degraded material may be dispersed into a carrier vehicle by mixing and blending without causing agglomeration due to the significant reduction in the bonding characteristics of the degraded material. As an example, if the powdered virgin material were mixed and blended into a carrier vehicle at room temperature, the powdered material would tend to agglomerate due to the bonding capabilities present in the virgin material. In the case of sintered material, it is difficult to economically comminute the material to the same fineness possible with the degraded material of this invention. In contrast, the degraded product of this invention may be comminuted to a rather fine particle size using standard comminuting equipment. Moreover, the comminuted degraded product of this invention does not agglomerate when mixed and blended in a carrier at room temperature, and may be physically uniformly distributed throughout a carrier without encountering agglomeration thereof because of the reduced bonding capabilities present in the degraded powder.

The degraded material of the present invention may readily be incorporated into a variety of vehicles depending on the ultimate purpose. For example, if the ground material is to be used to lubricate a machine part such as a bearing, it may be mixed with a lubricating oil or grease in sufficient quantity to hold the powder together for application to the area to be lubricated. Satisfactory results have been obtained with the proportion of powder to vehicle ranging from 10 to 50% by weight, with the preferred range being 25 to 35%. The lubricant vehicle should be selected in accordance with the desired viscosity for the mixture in its intended place of use, and the resulting mixture has excellent lubricating properties as well as the resistance to abrasion and heat which characterizes the fluorocarbon resins.

The ground powder prepared as described may also be mixed with a vehicle such as a lacquer or varnish for bonding it to a surface to be lubricated, and for such uses it is also easily mixed in desired uniform dispersion in the vehicle by reason of its freedom from agglomerating tendencies. Lubricating coatings may be applied in this manner to any surface, or a portion of any surface to which the carrier vehicle will adhere, including metal and wood base members, to provide relatively friction-free surfaces thereon. Similarly the ground material may be bonded on the surface of articles of the natural or synthetic type, such as seals, and will provide the reduced frictional properties imparted by the resin without affecting the resilience of the rubber.

The following examples are illustrative of the many possible formulations which can be compounded with the degraded material of this invention:

EXAMPLES

| | Parts by weight |
|---|---|
| Lubricating grease (commercial petroleum oils thickened by the addition of metallic soap such as aluminum, calcium and lead) | 90 |
| Degraded powdered polytetrafluoroethylene (degraded powdered PTFE) | 10 |
| Lubricating grease | 50 |
| degraded powdered PTFE | 50 |
| Petrolatum | 50 |
| Degraded powdered PTFE | 50 |
| Petrolatum | 75 |
| Degraded powdered PTFE | 25 |
| Alkyd resin solution | 50 |
| Degraded powdered PTFE | 50 |
| Linseed oil modified alkyd resin solution | 75 |
| Degraded powdered PTFE | 25 |
| Linoleic acid modified alkyd resin solution | 80 |
| Degraded powdered PTFE | 20 |
| Rosin modified alkyd resin solution | 90 |
| Degraded powdered PTFE | 10 |
| Rosin modified alkyd resin solution | 50 |
| Degraded powdered PTFE | 50 |
| Shellac solution | 60 |
| Degraded powdered PTFE | 40 |
| Shellac solution | 90 |
| Degraded powdered PTFE | 10 |
| Varnish of the long or short oil variety | 75 |
| Degraded powdered PTFE | 25 |
| Varnish of the long or short oil variety | 50 |
| Degraded powdered PTFE | 50 |
| Water | 75 |
| Degraded powdered PTFE | 25 |
| Water | 50 |
| Degraded powdered PTFE | 50 |
| Motor oils (lubricating) | 50 |
| Degraded powdered PTFE | 50 |
| Motor oils (lubricating) | 75 |
| Degraded powdered PTFE | 25 |

In the case of the film forming, binders, examples of which are the alkyd, and modified alkyd resin binders, as well as the shellac and the varnish formulations above noted, the parts by weight figure is based on the percentage of degraded powdered polytetrafluoroethylene present in the dry film subsequent to the evaporation of solvents present. In the case of the lubricating greases and oils and water of the previous examples, the parts by weight figures are based on the weight of each of the components of the liquid or semi-liquid mixture. In instances where a hydrocarbon stable film forming binder is required, about 10 to 50 parts by weight of the degraded powdered product of this invention may be incorporated into a vehicle such as a sodium silicate (water glass) composition which may be rendered insoluble to form a stable film forming binder, as is well known in the art.

It is to be understood that the above examples are merely representative of many possible formulations including virtually an unlimited number of vehicles, since polytetrafluoroethylene, even the degraded product previously described, is virtually unaffected by the majority of chemicals or vehicles which are available.

As can be understood, the degraded porduct of this invention provides a relatively stable dispersion which tends to resist agglomeration or fluocculation even when exposed to relatively high temperatures when used alone or in connection with a carrier vehicle therefor. For example, between 10 and 50 parts by weight of degraded powdered polytetrafluoroethylene may be dispersed in a liquid which is relatively stable at elevated temperatures, for example, high quality mineral oil or a high boiling aliphatic or aromatic hydrocarbon. When utilized under extreme conditions of heat, for example about 500 to 700° F., the composition remains stable and operates efficiently as a lubricant.

If desired, certain other materials may be added to the above liquid compositions including thixotropic agents for improved rheology, or wetting agents to improve the receptivity of the liquid coating mixture with respect to the surface being coated.

In addition to the above additives to the liquid compositions, additives may be utilized with the degraded material itself to vary or modify certain properties thereof. For example, if fillers such as coke flour, asbestos, molybdenum powder, glass, copper, talc, and other materials are utilized, it is possible to alter such properties such as wear, volume resistivity, density, coefficient of thermal expansion and coefficient of friction in order to provide products to fill a special need. If the additives are placed in the material before degradation, the filler employed should be stable at the degradation temperature. On the other hand, if the additives are blended into the comminuted material after degradation, any of the conventional well known fillers may be utilized.

As noted, the invention may be practiced by using either virgin or already preformed and sintered fluorocarbon resins, but for reasons of economy it offers special advantages in the re-use of the scrap material from preformed and sintered parts. Furthermore, the reheated material which has already been sintered is somewhat easier to regrind than the virgin material, which is another practical advantage. It is not essential, however, to grind the scrap material before it is reheated, although from the standpoint of convenience of handling it may be desirable to chop it into comparatively small pieces before the reheating treatment, and it is then also somewhat simpler to handle during the subsequent regrinding.

While the products and method herein described constitute preferred embodiments of the invention, it is to be understood that the invention is not limited to these precise products and method, and that changes may be made therein without departing from the scope of the invention which is defined in the appended claims.

What is claimed is:

1. An article of manufacture comprising a base member having a portion thereof coated with a composition consisting essentially of a film forming binder having uniformly dispersed therethrough a finely divided degraded polytetrafluoroethylene having a tensile strength less than the tensile strength of sintered polytetrafluoroethylene resin material.

2. An article as set forth in claim 1 wherein said degraded material is present between 10 and 50 parts by weight of said film forming binder.

References Cited

UNITED STATES PATENTS 2,394,581   2/1946   Benning et al. _____ 260—92.1

JOSEPH L. SCHOFER, *Primary Examiner.*

JOHN A. DONAHUE, JR., *Assistant Examiner.*

U.S. Cl. X.R.

252—58; 260—22, 23, 27, 28.5, 29.6, 873